United States Patent Office 3,277,282
Patented Oct. 4, 1966

3,277,282
TRACKING DEVICE FOR AERIAL TARGETS
Alfred Kuhlenkamp, 42 Maschstrasse,
Braunschweig, Germany
Filed Aug. 17, 1962, Ser. No. 217,658
Claims priority, application Germany, Aug. 22, 1961,
K 44,546
14 Claims. (Cl. 235—61.5)

The invention relates to a device for the manual control of antiaircraft guns.

In order to aim arms and devices which are pivotable around a vertical axis and an axis at an angle of 90° to said vertical axis, against rapidly moving targets, hydraulic or electric power drives are used which can be operated by simple manipulations. For this purpose, so-called speed drives are known which are operated either by two manipulations or by a single control lever influencing both directional movements of the gun or device.

It has been found that the operation of the drives with respect to very fast moving targets is nonetheless difficult; because of the fast changes of the angular velocities required for turning the gun or device around both axes, the positions of the control handle or lever must also change fast, and the operator is not always able to find the correct positions of the control elements. For this reason, a control device has been proposed which, in connection with a control lever, provides for easier operation by restricting the mobility of said control lever. For this purpose, the control lever is guided in a radial track in a rotatable disc, and the direction of movement of the control lever is predetermined by automatic rotation of the disc carrying said track as the result of a computing process; in this way, the operator need only manually adjust the magnitude of the angular movement of the control lever in the predetermined direction. Said known control device is not yet a perfect solution of the problem. It is limited to lever control and still leaves to the operator an essential part of the tracking operation.

Also this invention relates to a device for manually controlling antiaircraft guns, or observation and surveying devices for airplanes where the drive velocities for setting the azimuth and elevation of the gun or device are adjustable as a result of target observations by means of an optical assembly movable with the gun or device and where the device is equipped with a computer tracking means or a director for assisting the operation of the gunner or observer.

A principal object of the invention consists in providing a device of the character described which avoids the drawbacks recited above and which insures an accurate actuation of the drives.

The invention consists essentially in providing: computer means for computing the maximum value of the lateral angular velocity in the flight plane from the values of the sight setting angles; computer means for continuously computing from said maximum value of the lateral angular velocity used as a constant the values of the lateral angles to be expected for following the target; further computer means for continuously computing the instantaneous lateral and elevational angular values for the gun or device from the computed value of the lateral angle in the flight plane; and means transmitting the computed last recited values of the lateral and elevational angles to the control drives of the gun or device.

For a better understanding of the present invention and the various objects thereof, reference is made to the following specification and to the accompanying drawings, in which.

For carrying out the invention it is essential to determine the maximum value of the lateral angular velocity in the plane of flight by computer means, to calculate the values of the azimuth and elevational angles required for following the target, and to use said values for training the gun or device. A precondition therefor is the knowledge of the motion of the target as it is represented as maximum circle or apparent path of the target on a sphere imagined as surrounding the gun.

Figure 1:
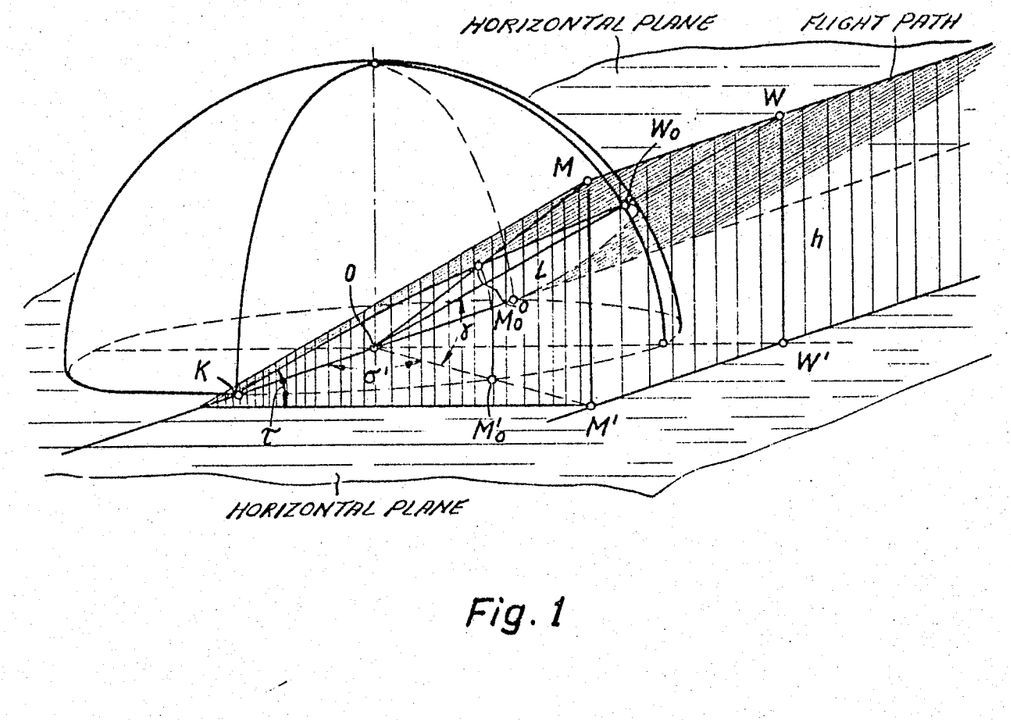
FIG. 1 comprises a geometrical representation of the true and apparent line of flight.

Referring now to FIG. 1, the position of the gun or device is denoted by O, and the maximum circle $KM_0W_0L$ designates an apparent line of flight, which is determined by the direction KL of the trace line and the angle of inclination $\tau$ of the flight plane given by the maximum circle. $M_0$ is any point on the apparent line of flight which is passed by the connecting line to point M on the actual line of flight. The direction towards point M is defined by the lateral angle $KM_0 = \sigma$ and the angle of elevation $M_0H'_0 = \gamma$. In the flight plane, the direction towards the point M is given by the lateral angle $MK = \sigma'$ and the angle of inclination of the flight plane $\tau$.

Figure 2:
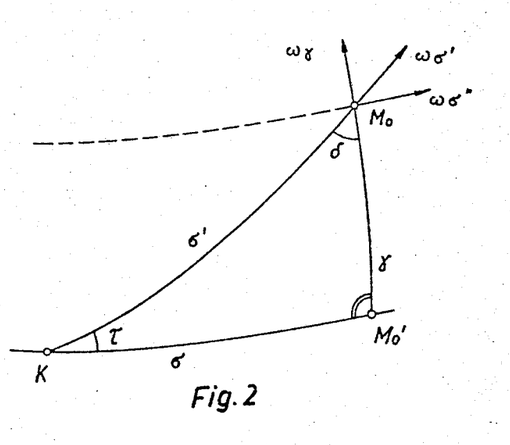
FIG. 2 is the right-angle spherical triangle showing the values of the angles determining the line of fire.

The angles lie in the spherical rectangular triangle $M_0'KM_0$ (FIG. 2), in which the angle at $M_0$ is also the angle of flight $\delta$, which indicates the apparent direction of flight.

In the plane of flight, there is the true line of flight MW associated to the apparent line of flight $KM_0L$, whereby W is the point where the distance from the position of the device is the smallest. This point is called the "change point."

Figures 3, 11:
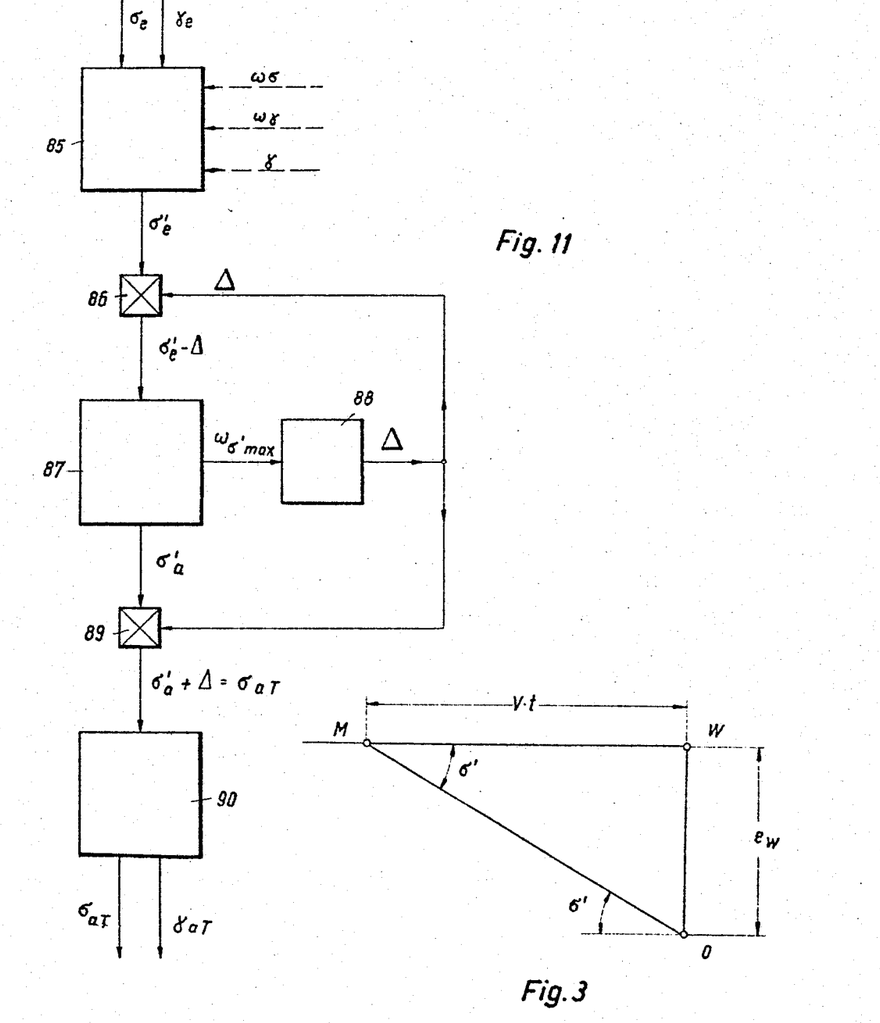
FIG. 3 shows the right-angle plane triangle in the plane of flight which indicates the position of the target point with respect to the change point.
FIG. 11 illustrates the entire assembly.

FIG. 3 shows the true line of flight in the flight plane with points M and W on said line. The lateral angle in the flight plane appears there at points O and M. For $e_w$ as the shortest distance, we have in the rectangle OMW $$\cot \sigma' = \frac{v}{e_w} \cdot t$$

where $v$ is the speed of flight and $t$ the time required by a plane, which is at point N, to reach the change point W. As $v/e_w$ equals the maximum lateral angular velocity $\omega\sigma'_{max}$ we have for the angular angle $\sigma'$ the relation $$\sigma' = \text{arc cot } \omega\sigma'_{max} \cdot t$$

wherein $\omega\sigma'_{max}$ is a constant.

If said constant $\omega\sigma'_{max}$ is known, the further time rate of the lateral angle $\sigma'$ can be calculated from this equation for any value of the lateral angle.

According to the invention, the values of the lateral angle in the flight plane to be expected in the further course of the path of the airplane are given by a cam disc and taken therefrom by feeding means, whereby the cam disc is driven at a rate corresponding to the maximum lateral angular rate in the flight plane.

Another solution according to the invention consists in using, instead of the values of the lateral angles, the values of the velocities of the lateral angles. In such case, the values of the maximal velocities of the lateral angles in the flight plane and the mathematical function $\sin^2 \sigma'$ of the lateral angle in the flight plane are computed.

Said maximum lateral angular velocity $\omega\sigma'$ may be determined as follows: The course of the lateral angle for a straight-line flight path according to FIGS. 1 or 3 is put as a function of the time on a rotatable or displaceable cam disc. The reference letters M' and W' are the projections of points M and W in the horizontal plane. K is the point in which the trace line K–L of the flight plane intersects the sphere.

Figure 4:
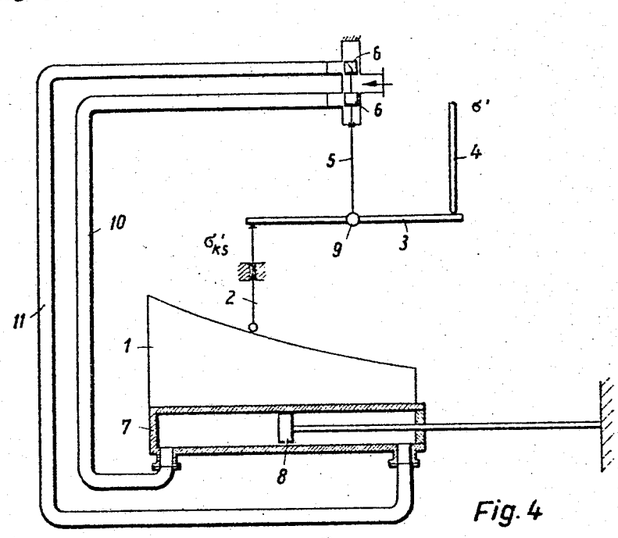
FIG. 4 shows, by way of example, the determination of the normal lateral angular velocity by means of a hydraulic control.

By way of example, FIG. 4 shows a cam disk 1 from which a feeler 2 takes off the respective lateral angle $\sigma'_{KS}$ and transmits it to a comparison gear consisting of a two-armed lever 3. At the opposite side of the pivot 9, said two-armed lever 3 is contacted by a tappet 4, which is adjusted in accordance with the lateral angle $\sigma'$ to the respective instantaneous target point, as calculated in the respective computer means. The rod 5, which is attached to the pivot 9, displaces a double piston slide valve 6 as soon as said displaceable pivot 9 moves upwardly or downwardly out of its zero position, defined by the horizontal position of the lever 3; thereby, a flow of hydraulic fluid is released which enters through lines 10 or 11 into the right-hand or left-hand part, respectively, of a long cylinder 7, which is fixedly joined to the cam disk 1, and displaces said cylinder with respect to the stationary piston 8 at a rate corresponding to the displacement of the slide valve. The position of said slide valve 6 changes as long as the lateral angle values $\sigma'_{KS}$, taken from the cam disk 1, do not coincide with the lateral angle values $\sigma'$ derived from the movement of the target. The operation is terminated as soon as said recited values of the angles coincide. Then, the cylinder 7 moves at a constant rate which is proportional to the sought maximum lateral angular velocity $\omega\sigma'_{max}$.

Figure 5:
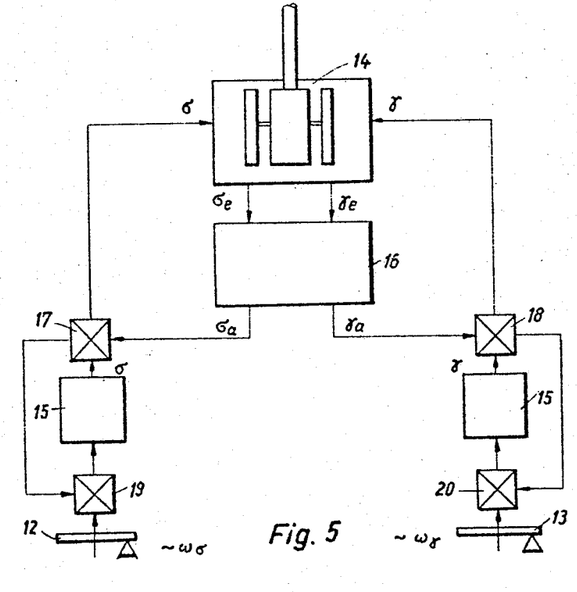
FIG. 5 is a diagrammatic view of the complete device.

The training drives are generally so-called speed controls in which the positions of the hand wheel are proportional to the velocities of the starting values, whereby such proportionality need not be strictly maintained in every case. FIG. 5 illustrates such a case.

By manipulating the hand wheels 12 and 13 and turning said wheels approximately proportionally to the velocities of the angular values $\sigma$ or $\gamma$, respectively, as they are present at the gun 14 or at the sighting device, the gun or device is aimed at the airplane by means of an optical sighting device. The sight setting gears 15 are in such case integration gears which give the required driving energy.

The angular values $\sigma$ or $\gamma$ of the gun are introduced as input values $\sigma_e$ and $\gamma_e$ in the computer aggregate 16. The device computes the future sighting values to be expected, which are compared as output values $\sigma_a$ and $\gamma_a$ in the differentials 17 and 18 with the angular values coming out of the sighting gear. The difference $\sigma_e - \sigma_a$ or $\gamma_e - \gamma_a$, respectively, between the angular value coming from the sighting gear and the required angular value serves to control additionally the control gears by superposition over the hand wheel value in the differentials 19 and 20. In this case, the control gears 16, after once having been positioned by means of the hand wheels 12 and 13 are automatically adjusted so that the operator can limit his manipulations to the corrections which may be required.

Figure 6:
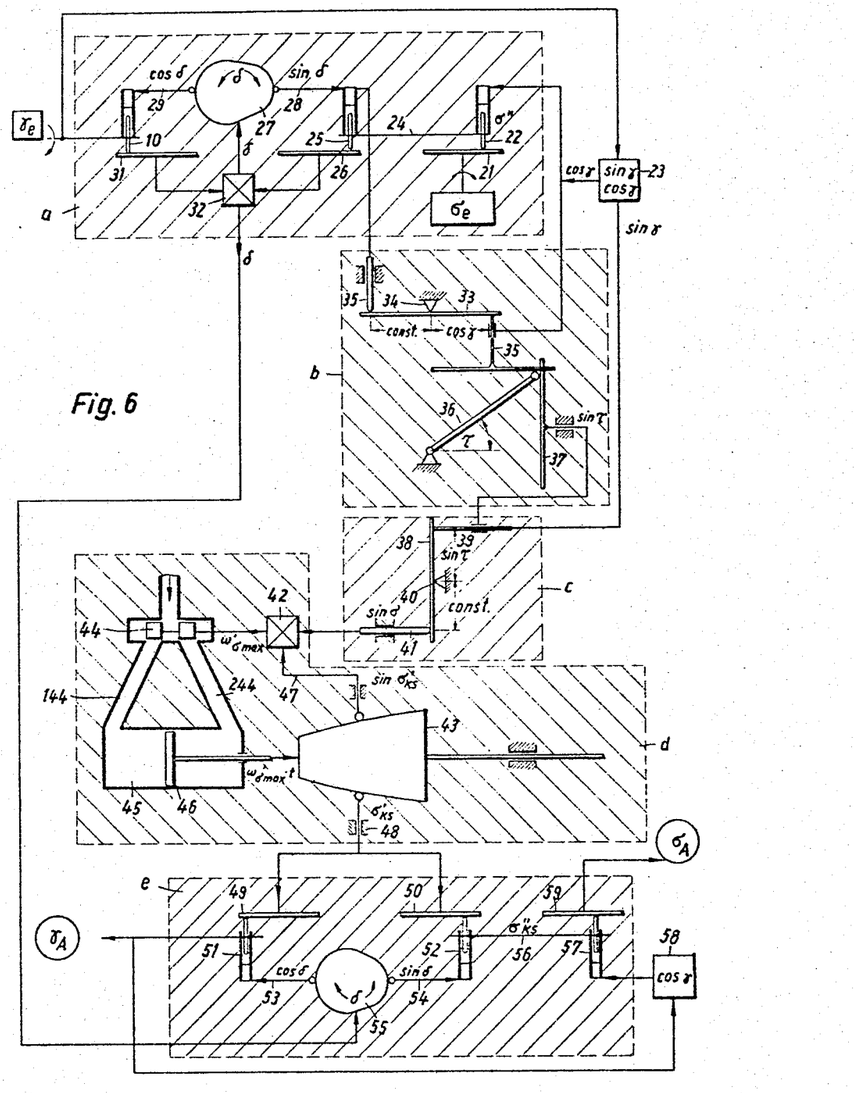
FIG. 6 is a view illustrating the structural arrangement of the tracking device and showing the angular values as input values for the computer means.

A constructive arrangement for the calculation problems to be solved in the tracking and orienting device is shown in FIG. 6. In this example, the values entering into the tracking device are the angle of elevation $\delta_e$ of the gun or sighting device, and the lateral angle $\sigma_e$. The first gear group serves to calculate the flight angle $\delta$. As will be seen from FIG. 6, it is first necessary to translate the changes of the lateral angle from the equatorial plane into the plane of the circle of latitude. This is done by turning the friction disc 21 by the lateral angle coming from the gun and displacing the friction disc 22 in proportion to the $\cos \gamma$, whereby $\cos \gamma$ is taken from the sine-cosine drive 23. From the relation $$\omega\sigma'' = \cos \gamma \cdot \omega\sigma$$

the lateral angle translated into the plane of the circle of latitude results as rotating value of the shaft 24 of the friction disc 22.

The shaft 24 carries the friction disc 22 as well as the friction disc 25 and directly drives the friction disc 26 of a second friction gear. Due to the mathematical relation $$\sin \delta = \frac{\omega\sigma''}{\omega\sigma'}$$

the speed of rotation of the friction disc 26 is equal to the angular velocity of the lateral angle $\sigma'$ in the flight plane when the friction disc 25 is displaced by the value of $\sin \delta$ from the centre of the friction disc 26. The displacement is produced by a cam disc 27, which is turned proportionally to the flight angle $\delta$ and which is so designed that it furnishes at the one side the value $\sin \delta$, and at the other side the value $\cos \delta$ as displacement values of the feelers 28 and 29.

The flight angle $\delta$ is obtained as a resultant of the rotation of the two friction discs 26 and 31, the friction roller 30 being turned proportionally to the angle of elevation and being displaced proportionally to the value $\cos \delta$.

As, in view of $$\cos \delta = \frac{\omega\gamma}{\omega\sigma'}$$

in this way the friction disc 31 turns like the friction disc 26 proportionally to the angular velocity $\omega\sigma'$, the position of the cam disc 27 is correct when the difference of the rotational values of the two friction discs 26 and 31 is zero. The rotational values are compared in a totalizing gear 32. The difference is used to turn the cam disc 27.

The thus determined value $\sin \sigma'$ enters the gear group b, which serves to determine the angle of inclination to the flight plane. Because of the spherical relation $$\cos \tau = \sin \delta \cdot \cos \gamma$$

the functional value $\cos \tau$ is computed in a multiplication gear in which the two-armed lever 33 is turned around the pivot 34 by displacing the tappet 35 in constant spaced relationship by the value $\sin \delta$ and in which at the other side of the pivot 34 the product value $\cos \tau$ is obtained by the tappet 35' at the distance $\cos \gamma$.

The tappet 35' is part of the sine-cosine gear for $\tau$, consisting of the crank 36 and the sine $\tau$ tappet 37. The conversion of the cosine value into the angle value $\tau$ is obtained in known manner (not illustrated) by means of a succession device.

The functional value $\sin \tau$ serves, in combination with the functional value $\sin \gamma$ coming from the gear 23, to compute, in accordance with the spherical relation $$\sin \sigma' \cdot \sin \tau = \sin \gamma$$

the functional value $\sin \sigma'$ in the gear group c comprising a multiplication gear. The multiplication lever 38 is actuated by the tappet 39, which is displaced by $\sin \gamma$ at the distance $\sin \tau$ from the pivot 40.

At the other side of the lever, this movement produces a proportional displacement of the tappet 41. The displacement is proportional to the sought functional value $\sin \sigma'$.

The functional value $\sin \sigma'$ is the input value into the main group $d$ of the device. It goes into the comparison gear 42 into which the functional value $\sin \sigma'_{KS}$, obtained from the cam disc 43, enters at the same time, by means of linkage 47. The difference $\sin \sigma' - \sin \sigma'_{KS}$ is used to displace the control valve 44 of a hydraulic integral control, which can be replaced by an electric or pneumatic control. According to its position (see also FIG. 4), the control valve 44 opens one of the two lines 144 and 244 to admit pressure oil into the cylinder 45 and to cause thereby the displacement of the piston 46 in such a way that a certain rate of displacement of the piston 46 is associated with each position of the control valve 44. The cam disc 43 is firmly connected with the piston rod 46. Said cam disc 43 is displaced until the functional value obtained from tappet 41 is equal to the functional value coming from the gear $c$. This is obtained for the entire range of change of the angle $\sigma'$ when the control valve 44 has taken a certain position corresponding to the maximum lateral angular velocity $\omega\sigma'_{max}$, as set forth hereinabove.

The lower part of the cam disc 43 is formed corresponding to the lateral angle $\sigma'_{KS}$ pertaining to the functional value $\sin \sigma'_{KS}$ so that the feeler 48 moves proportionally to $\sigma'_{KS}$. Said angular value is the input value into the last gear group $e$, whose structure is similar to that of the gear group $a$. The angular value $\sigma'_{KS}$ turns both friction discs 49 and 50. The two friction rollers 51 and 52 are displaced, like those in the gear group $a$, by the two tappets 53 and 54 by turning the $\delta$ cam disc 55, and they furnish as output values on the one hand the angle of elevation $\delta_A$, and on the other hand the lateral angle $\sigma''_{KS}$ in the plane of the latitudinal circle. The angular value appearing as rotational value of shaft 56 turns the friction roller 57, which is displaced according to the value $\cos \gamma$ formed in the cosine gear 58. The friction disc 59 thus gives as a rotating value the lateral angle $\sigma_A$ as a second output value of the device.

In order to avoid interferences which through the input values $\sigma_e$ and $\gamma_e$ in the input group $a$ might affect the determination of the flight angle, it is possible, in accordance with the spherical relation $$\cos \tau = \sin \delta \cdot \cos \gamma$$

already used, to employ an additional gear group and to form therein the functional value $\sin \delta$, and therefrom $\delta$, from the functional $\cos$ value, taken at the tappet 35 of the gear group $b$ if necessary, dampened by known mechanical or electrical damping means, and from the functional value $\cos \gamma$ formed in gear 58.

In the structure of the computer means shown in FIG. 6, it has been assumed that the values of the lateral and elevational angles at the device or gun go directly into the computer. However, the input values for the computer may also be calculated from the angular velocity values of the lateral and elevational angles. Such a case is shown, by way of example, by the structure of the computer means according to FIG. 7.

Figure 7:
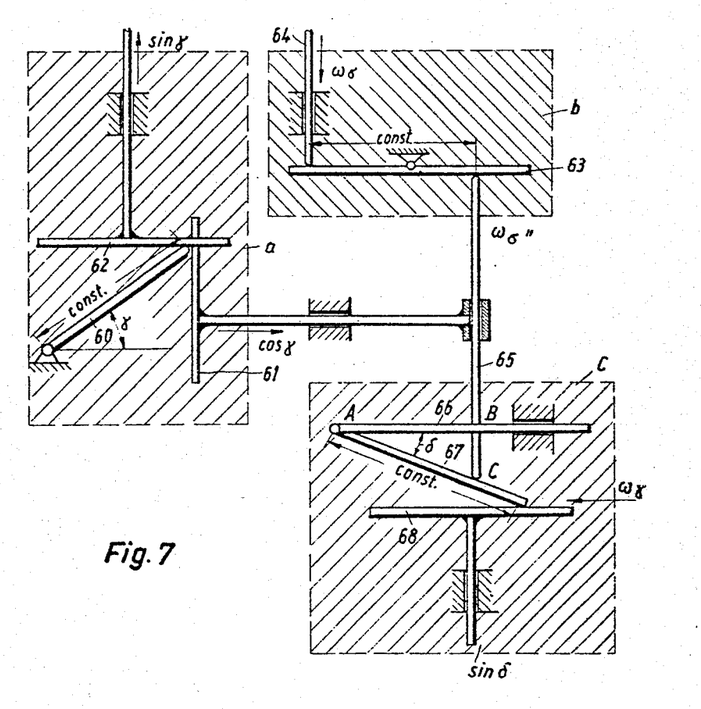
FIG. 7 shows the arrangement of the device with the angular velocities as input values.

The computer group $a'$ constitutes a sine-consine gear, in which the functional values $\sin \gamma$ and $\cos \gamma$ are formed from the angle of elevation $\gamma$. For this purpose, the crank 69 of constant length is turned in accordance with the angle of elevation $\gamma$ so that the two feelers 61 and 62, which contact the crank 60 and are displaceable in directions perpendicular to each other, are displaced proportionally to the value $\sin \gamma$ and $\cos \gamma$. The movement of the cosine feeler 61 is transmitted to the gear group $b'$, which consists of a multiplication gear in which the multiplication lever 63 is, at one side, deflected a distance from its pivot, through linkage 64 equal to the value of the lateral angular velocity $\omega\sigma$. The feeler 65, which contacts the other side of lever 63, is displaced from the pivot of the lever 63 through the cosine feeler 61 by the functional value $\cos \gamma$ so that the length of its displacement is proportional to the product $\omega\sigma \cdot \cos \gamma$. This product indicates the lateral angular velocity $\omega\sigma''$ in the plane of the latitude circle. Said lateral angular velocity $\omega\sigma''$ enters as displacement movement of the rod 65 into the gear group $c'$, in which the flight angle $\delta$ is determined. Said gear consists of a crank 67 rotatably mounted on the displaceable rod 66. Said rod 66 is displaced proportionally to the angular velocity $\omega\gamma$ of the angle of elevation. The crank 67 is actuated by the feeled 65 so that a rectangular triangle ABC is formed in which the relation $$\tan \delta = \frac{\omega\sigma''}{\omega\gamma}$$

obtains. By the pivotal movement of the crank 67, there appears at A the flight angle $\delta$ from which, by the arrangement of the feeler 68 contacted by the crank 67, the functional value $\sin \delta$ is formed and transmitted as displacement of the feeler 68. The further computation proceeds according to FIG. 6.

The gear structure illustrated in FIG. 6 also furnishes the course of the lateral angle in the flight plane by means of the cam disc 43.

In another embodiment of the invention, the lateral angular velocity $\omega\sigma'$ may be computed for each point of the flight path on the basis of the calculated maximum lateral angular velocity $\omega\sigma'_{max}$ as a function of the lateral angle according to the equation $$\omega\sigma' = \omega\sigma_{max} \cdot \sin^2 \sigma'$$

Figure 8:
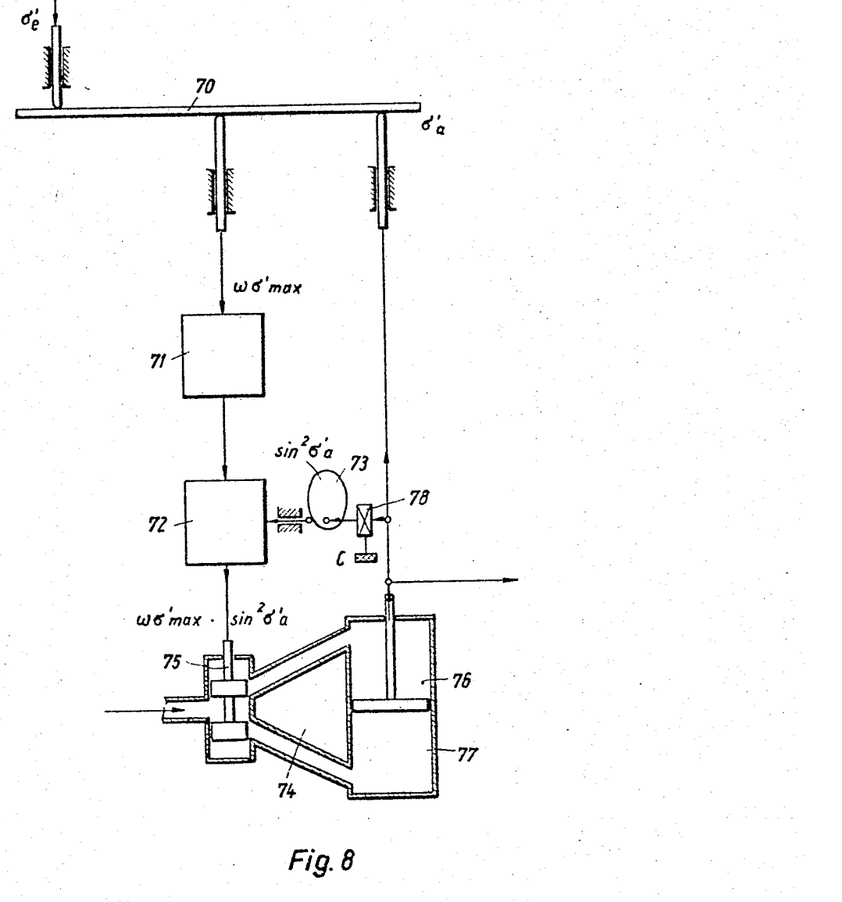
FIG. 8 shows the structure for calculating the value of the angular velocities.

In this case, as illustrated in FIG. 8, the instantaneous introduced lateral angular value $\sigma_e$, obtained from the rotation of the friction discs 26 or 31 of the gear group $a$ (FIG. 6) is introduced at one side of a comparison gear 70, into the other side of which the output value $\sigma_a'$ is introduced. The difference $\sigma_e' - \sigma_a'$, which, after the gear elements have been brought in position, is proportional to the wanted maximum lateral angular velocity $\omega\sigma'_{max}$, is first introduced into a delay or dampening gear 71, which dampens, by known hydraulic or electrical means, oscillations introduced by the input values. The dampened value $\omega\sigma'_{max}$ is then transmitted to the multiplication gear 72, into which, in addition, the functional value $\omega\sigma'_{max}$, obtained from a cam disc 73, is introduced. In an integral control gear 74, the control valve 75 is displaced proportionally to the product $$\omega\sigma' \cdot \sin^2 \sigma'$$

so that the correspondingly adjusted amount of hydraulic fluid moves the piston 76 in the hydraulic cylinder 77 at a rate proportional to the angular velocity $\omega\sigma'_a$. The output value is the value of the lateral angle to be expected $\sigma'_a$, which on the one hand, goes into the group $e$ of FIG. 6 and is there converted to the later value of the lateral angle $\sigma$ in the horizontal plane and to the angle of elevation $\gamma$. In addition, the output value serves to drive the cam disc 73 (FIG. 8).

In front of the cam disc, there must be introduced, by a differential 78, the integration constant C which indicates the zero point of the lateral angle count. After the elements have assumed their positions, $\omega\sigma'_{max}$ is constant; the output value $\sigma_a'$ changes continuously, due to the relation between $\omega\sigma'_{max}$ and $\sin^2 \sigma'$ effected in the gear.

If the device shall be used in connection with sighting mechanisms which serve to survey a target, the structure illustrated by way of example in FIGS. 6–8 is sufficient to solve the problem. If, however, the device is used with antiaircraft guns, the additional problem of computing the lead angle is to be solved, and the influence of the lead range on the azimuth range.

Figure 9:
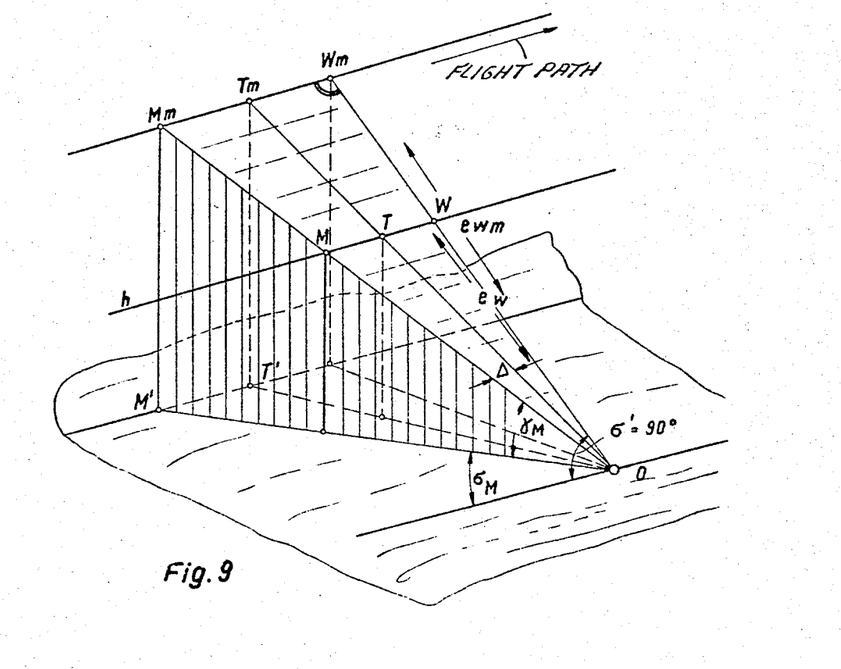
FIG. 9 shows the geometrical relationship for calculating the lead angles.

As shown in FIG. 9, we have to distinguish in such a case between the present position M of the airplane on its straight-line course, and the target point T, which designates the future position of the airplane after the end of the time of flight of the projectile where airplane and projectile are supposed to meet. The reference letters $\sigma_M$ and $\gamma_M$ designate the lateral angle and the angle of elevation to point M. The lead angle $\Delta$ is located in the plane of flight between the two directions to points M and T.

The maximum lateral angular velocity $\omega\sigma'_{max}$ in the flight plane, which forms the basis of my tracking procedure, can be used for computing the lead angle. This is done by computing the lead angles for all points of the flight path by means of a straight-line flight path plotted through the mean fire range, whereby such lead angles then apply also with sufficient precision for all flight paths within the fire range which deviate from the mean flight path. In FIG. 9, said mean flight path may be assumed as the shortest distance $OW_m$—$ew_m$ of 600 m. for a certain gun bore. Points $M_m$ and $T_m$ lie on said mean flight path. It will be further assumed that the true flight path passes the observer at the distance $e_w$ and that points M and T lie on said true flight path. From the maximum velocity of the lateral angle $\omega\sigma_{max}$, determined by the computer means of the device, the velocity of the plane for the mean flight path (e.g. $ew_m = 600$) is found to be $$Vew_m = \frac{\omega\sigma'_{max}}{ew_m}$$

Figure 10:
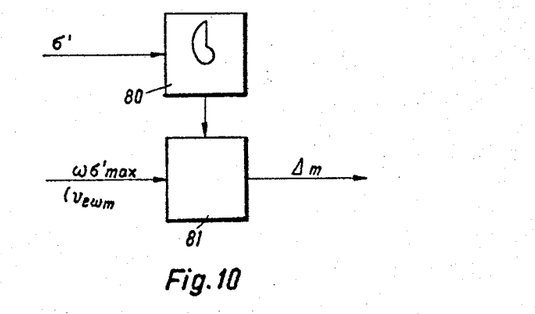
FIG. 10 shows diagrammatically the arrangement of the lead angle computer.

Said velocity value permits the computing, in a known manner of the lead distance and lead angle $\Delta$ for each point of the mean flight path, i.e. as a function of the lateral angle in the flight plane, from the flight time of the projectile, which is known from the ballistics of the gun and projectile. As explained in FIG. 10, this computation requires a gear 80, which may be, by way of example, cam disc gear, which, when turned proportionally to the previously determined lateral angle $\sigma''$, furnishes as a displacement value of a feeler the time of flight of the projectile $t_G$ for the points lying on the mean flight path. Said time of flight of the projectile $t_G$ then enters the gear group 81, into which is also introduced the maximum velocity of the lateral angle $\omega\sigma'_{max}$, which is proportional to the airplane velocity $Vew_m$ on the mean flight path. By solving the angular relations in the oblique-angled triangle $OM_mT_m$ (FIG. 9) with known mechanical or electrical means, both said values furnish the lead angle $\Delta_m$. The lead angles $\Delta_m$ on the mean flight path would be valid also for all parallel flight paths if the distance differences $M_m - M$ would be proportional to the differences of the times of flight of the projectile to the points $T_m$ and T. As the time of flight of a projectile increases faster than linearly with increasing distance, there occurs an error which, however, can be disregarded for a favorably selected mean flight path.

FIG. 11 shows diagrammatically the complete arrangement. Either the current value of the lateral and elevational angles, $\sigma_e$, $\gamma_e$ or the angular velocities $\omega\sigma$, $\omega\gamma$ and angle of elevation $\gamma_e$, are introduced as input values into the input computer 85, which computes from these values the lateral angle $\sigma_e'$ in the flight plane. If a lead has to be computed, the lead angle $\Delta$, contained in the input values, is deducted from the lateral angle in the differential 86. The difference $\sigma_e' - \Delta$ is introduced into the main computer group 87, in which the maximum velocity of the lateral angle $\omega\sigma'$ and from said velocity the instantaneous value of the lateral angle $\sigma_a'$ is computed. The maximum velocity of the lateral angle is introduced into the lead computer 88. The lead angle $\Delta$, resulting from the lead computation, goes on the one side by way of differential 86 to the input value, and on the other side by way of differential 89 to the output value. By adding the lead angle $\Delta$ to the value of the lateral angle $\sigma_a$, the value of the lateral angle $\sigma_{aT}$ is obtained for the future position. Said value is converted in the output computer 90 into the values $\sigma_{aT}$ in the horizontal plane and the values $\gamma_{aT}$ of the angle of elevation, which control the orientation of the gun.

Therefore, my device allows, due to the supplementary lead computer means, to automatically aim a gun upon a target, including computation of the lead angles, after the target has been manually picked up. Thereby, neither knowledge of a range value nor estimation of the direction or speed of flight of the target is necessary. After the gun has been manually turned on the target, it follows the target automatically and remains aimed at the point of impact.

I claim:

1. In an apparatus for the manual training of antiaircraft guns having powered train and elevation drive means, where the drive speeds for train and elevation of the gun are set by hand on the basis of target observations by optical means moved with the gun, a device for facilitating and assisting the operation by the gunner, which device comprises first computer means for computing the maximum value of the velocity of the lateral angle in the flight plane from the values of the angles obtained on the pick up and instantaneous sight setting of the target; second computer means for the continuous computation of the values of the lateral angles in the flight plane to be expected for following the target, said computation using said calculating maximum value of the velocity of the lateral angle as a constant; third computer means for computing the current values of the lateral and elevational angles for the gun from the computed value of the lateral angle in the flight plane; and transmitting means for transmitting said last recited values to the train and elevation drives of the gun.

2. An apparatus as claimed in claim 1, wherein one of said computer means includes a cam disc having a curve form corresponding to the values of the lateral angles to be expected in the flight plane, and a feeler in engagement with said disc for taking up said values, and means for driving said disc at a speed corresponding to the maximum value of the lateral angular speed in the flight plane.

3. An apparatus as claimed in claim 2, wherein said second computer means compute the values of the lateral angular velocities in the flight plane to be expected from the maximum value of the velocity of the lateral angle in the flight plane and the function $\sin^2 \sigma'$ of the lateral angle in the flight plane.

4. An apparatus as claimed in claim 1 further comprising a displaceable cam disc receiving the lateral angle $\sigma'$ as a function of time, which angle serves to determine the maximum velocity of the lateral angle for a straight line flight path, a feeler in engagement with said disc taking said angle $\sigma'$ from said cam disc as displacement value, a comparison gear constituted by a two-armed lever one arm of which is connected with said feeler, and a tappet contacting the other arm of said lever, said tappet being displaceable in accordance with the computed lateral angle $\sigma'$ to the respective present position of a target.

5. An apparatus as claimed in claim 4 further comprising a rod attached to the pivot of said two-armed lever, a cylinder fixedly joined to said cam disc, a stationary piston dividing said cylinder into two compartments, hydraulic lines communicating with each of said compartments, and a double piston control valve connected with said rod for controlling said hydraulic lines to admit hydraulic fluid to one or the other of said compartments and displacing said cylinder with respect to said piston.

6. An apparatus as claimed in claim 1 wherein said train and elevation drives are speed drives including handwheels positioned proportional to the velocity of the output values.

7. An apparatus as claimed in claim 6 wherein the gun is trained by turning the handwheels substantially proportionally to the speed of the angular values $\sigma$ and $\gamma$ in accordance with optical sighting means, and wherein the train and elevation drives include integration gears for furnishing the required driving energy.

8. An apparatus as claimed in claim 7 which includes means for computing the maximum velocity of the lateral angles from the values of the lateral and elevational angles of the gun.

9. An apparatus as claimed in claim 8 wherein means is provided for introducing the present values of the angles $\sigma$ and $\gamma$ as input value into the computer aggregate of the device for computation of the tracking values to be expected, and including means for comparing tracking values as output values in differentials with the angular values coming from the train and elevation drives.

10. An apparatus as claimed in claim 9 wherein means is provided for using the difference between the angle value coming from the train and elevation drive and the required angle value to adjust said drive by superposition over the handwheel value in said differentials, thereby automatically adjusting said drives after they have been set on target by means of the handwheels.

11. An apparatus as claimed in claim 1 in which the maximum lateral angular velocity is computed from the lateral and elevational angular velocities of the gun.

12. An apparatus as claimed in claim 11 wherein the present angular velocity values $\omega\sigma$ and $\omega\gamma$ and the elevational angle is introduced as input values into the computer aggregate of the device for computation of the tracking values to be expected, which tracking values are compared as output values in differentials with the angular coming from the train and elevation drives.

13. An apparatus as claimed in claim 1, wherein the lead angles are computed from the value of the maximum lateral angular velocity.

14. An apparatus as claimed in claim 13 wherein the lead angles are computed for a straight-line flight path laid through the mean fire range for all points of the flight path, which lead angles apply to all flight paths within the range of the gun that deviate from said mean flight path.

No references cited.

MALCOLM A. MORRISON, *Primary Examiner.*

K. W. DOBYNS, *Assistant Examiner.*